US010762109B2

(12) United States Patent
Rushan et al.

(10) Patent No.: US 10,762,109 B2
(45) Date of Patent: Sep. 1, 2020

(54) ASYNCHRONOUS DELETION IN NON-RELATIONAL DATABASES

(71) Applicant: salesforce.com, inc., San Francisco, CA (US)

(72) Inventors: Shaahin Mehdinezhad Rushan, Dublin, CA (US); Percy D. Mehta, Foster City, CA (US); Yogesh Patel, Dublin, CA (US); Shan-Cheng Ho, Sunnyvale, CA (US); Shreedhar Sundaram, San Mateo, CA (US)

(73) Assignee: salesforce.com, inc., San Francisco, CA (US)

( * ) Notice: Subject to any disclaimer, the term of this patent is extended or adjusted under 35 U.S.C. 154(b) by 216 days.

(21) Appl. No.: 16/047,738

(22) Filed: Jul. 27, 2018

(65) Prior Publication Data

US 2020/0034473 A1 Jan. 30, 2020

(51) Int. Cl.
| | | |
|---|---|---|
| *G06F 16/27* | (2019.01) | |
| *G06F 16/22* | (2019.01) | |
| *G06F 16/21* | (2019.01) | |
| *G06F 16/245* | (2019.01) | |
| *G06F 16/23* | (2019.01) | |

(52) U.S. Cl.
CPC .......... *G06F 16/273* (2019.01); *G06F 16/214* (2019.01); *G06F 16/22* (2019.01); *G06F 16/2379* (2019.01); *G06F 16/245* (2019.01)

(58) Field of Classification Search
USPC ......................... 707/602, 792, 613
See application file for complete search history.

(56) References Cited

U.S. PATENT DOCUMENTS

| | | | | |
|---|---|---|---|---|
| 5,819,251 | A * | 10/1998 | Kremer | G06F 16/284 |
| 10,146,814 | B1 * | 12/2018 | Gupta | G06F 16/2228 |
| 10,565,203 | B1 * | 2/2020 | Lashmet | G06F 16/289 |
| 2013/0173664 | A1 * | 7/2013 | Xue | G06F 16/25 707/792 |
| 2016/0162550 | A1 * | 6/2016 | Wang | G06F 16/258 707/602 |

* cited by examiner

*Primary Examiner* — Hung T Vy
(74) *Attorney, Agent, or Firm* — Holland & Hart LLP

(57) ABSTRACT

Methods, systems, and devices for asynchronous deletion at a non-relational database are described. The non-relational database may store a set of data object associations. The non-relational database may receive a read request indicating a first data object identifier. Based on the first data object identifier indicated in the read request, the non-relational database may identify a second data object identifier according to a first data object association of the stored set of data object associations that is indexed in the non-relational database with the first data object identifier. The non-relational database may determine that a last data entry that is indexed in the non-relational database with the identified second data object identifier and is associated with the first data object identifier has been deleted from the non-relational database. The non-relational database may delete the first data object association from the non-relational database.

20 Claims, 11 Drawing Sheets

ASYNCHRONOUS DELETION IN NON-RELATIONAL DATABASES

FIELD OF TECHNOLOGY

The present disclosure relates generally to database systems and data processing, and more specifically to asynchronous deletion in non-relational databases.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A database system associated with the cloud platform may receive large volumes of data entries from different user devices to store user related activities. In some cases, the data entries may be stored in a non-relational database. However, storing large volumes of data entries in a non-relational database may cause increased latency associated with searching, adding, or modifying data. For example, a non-relational database may perform better with a single index to search for the data entry of interest within the non-relational database. Additionally or alternatively, performing various data manipulation operations and data synchronizations from different user devices may result in a large overhead at the database, limiting the efficiency of the database system due to the high volume of data.

DETAILED DESCRIPTION

Figure 1:
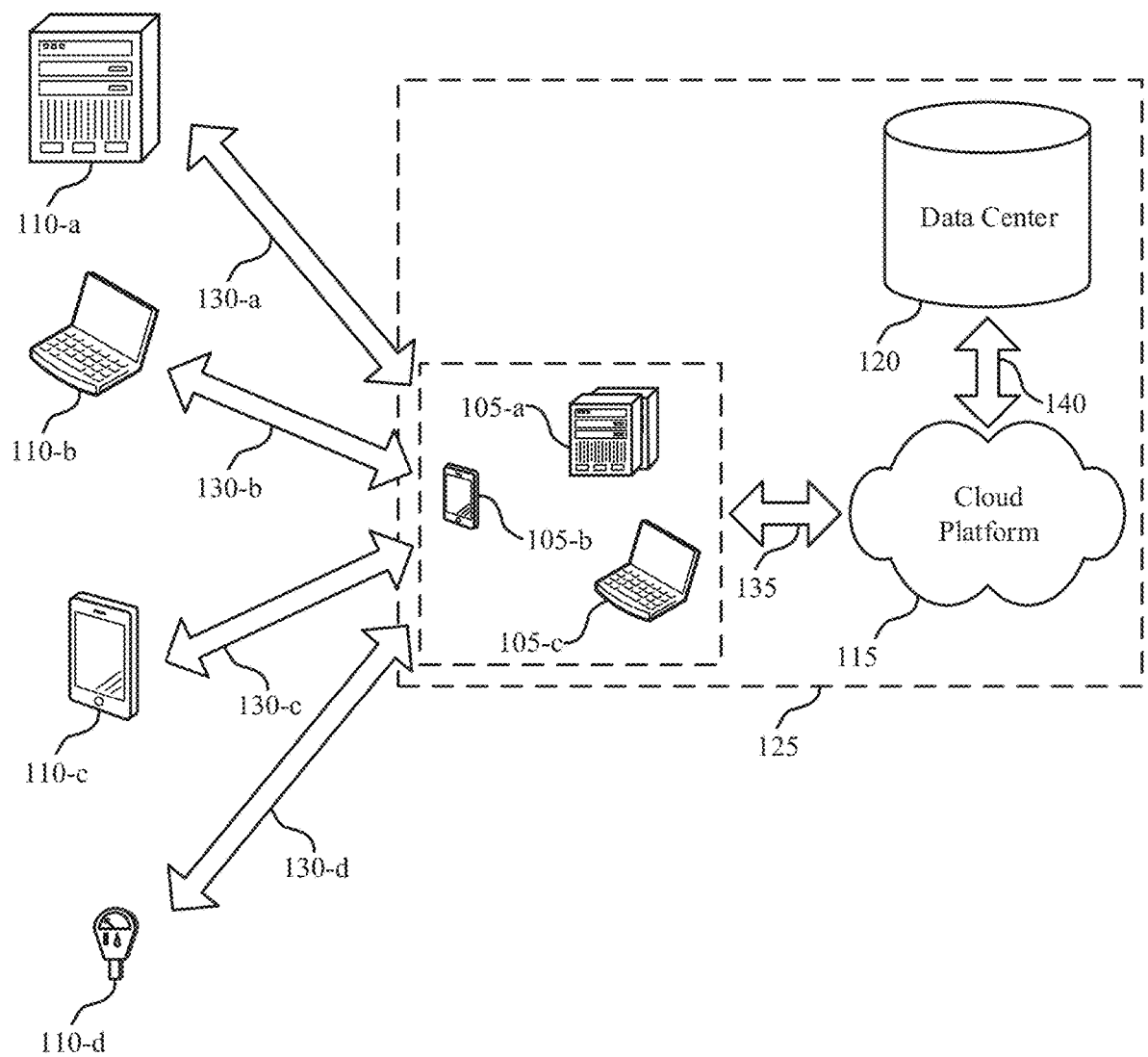
FIG. 1 illustrates an example of a system for handling data object associations within a non-relational database that supports asynchronous deletion in non-relational databases in accordance with aspects of the present disclosure.

A cloud computing system may support customer relationship management (CRM) software, tools, and/or data storage. For example, a database system within the cloud computing system may store large amounts of data related to user activities (e.g., emails received or transmitted, calendar information, website visit information, etc.). These user activities may be associated with certain CRM records (e.g., specific contacts, accounts, etc.). In some cases, multiple users may store, access, and modify data using cloud-based CRM applications. The following described techniques may handle a large volume of data storage while supporting high performance, scalability, and low latency, by using a non-relational database system.

Non-relational database systems may contain one or more databases served by a set of servers, which may be referred to as application servers or database servers. These application servers may act as gateways for user devices to access the databases. For example, the application server or user device may perform functionality for modifying or accessing data records stored in the non-relational database system, or any other operations associated with the non-relational database system. In some cases, data records in the non-relational database may be synchronized with data records in a relational database. For example, an association between data records in the relational database may correspond to an association in the non-relational database. In this case, internal CRM relationships associations stored in a relational database) may be synched with an external system (e.g., non-relational database).

Non-relational databases may store relationships (e.g., data object associations) between the data records in separate tables without maintaining relational integrity. That is, each table may support a single index for searching the data records. In this way, the application server or the user device may modify or access the data records only by searching a primary key index associated with the data record of interest.

In some cases, a data entry may be deleted from the table. For example, if a specific contact is no longer associated with the account, the data entry may be deleted. Conventionally, when a data entry is deleted in the non-relational database, the database searches through the entire list of data entries to determine if the data entry still exists. For example, the database may search through the entire list of entries to determine if this was the last data entry associated with the primary key index. Performing this search process at the time of the deletion operation requires a large amount of processing resources and time.

To reduce the time and resources utilized during this search process, the database may delete the corresponding association between the data entry of interest and the primary key index. For example, the non-relational database may determine that a last data entry that is associated with the primary key index has been deleted from the non-relational database. This association may then be deleted from the non-relational database to prevent additional searching for the last entry previously deleted.

Prior to deleting the association in the non-relational database, the non-relational database may first store one or more associations between a data entry and the primary key index in the non-relational database. The non-relational database system may receive a read request indicating the primary key index. The database may identify a data object (e.g., data entry) according to the stored association between the data entry and the primary key index. In some cases, the database may search for the data object in a separate table (e.g., the data object is the primary key index in a second table) to identify the data entry of interest.

Aspects of the disclosure are initially described in the context of an environment supporting an on-demand database service. Aspects of the disclosure are further illustrated by and described with reference to apparatus diagrams, system diagrams, and flowcharts that relate to asynchronous deletion in non-relational databases.

FIG. 1 illustrates an example of a system 100 for cloud computing that supports asynchronous deletion in non-relational databases in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Subsystem 125 may support asynchronous deletion in non-relational databases. For example, a non-relational database—which may be a component of the cloud platform 115 or data center 120—may store associations (e.g., an association between user activities and CRM records) where the associations correspond to a relational index stored in a relational database. In some cases, the non-relational database may initially receive a read request indicating a primary key index (i.e., a first data object identifier). The non-relational database may identify a data entry corresponding to the primary key index (i.e., a second data object identifier) . For example, the second data object identifier may be identified according to an association that is indexed with the primary key index. The non-relational database may determine that a last data entry that is indexed with the identified second data object identifier has been deleted from the non-relational database. The non-relational database may delete the association that the second data object identifier is indexed with the primary key index. For example, deleting the association may be in response to the read request and based on determining the last data entry is deleted.

With this system 100, if a data entry in the non-relational database is deleted, the system 100 may not allow stale entries (e.g., data object associations) to persist in the database in order to improve performance, and may filter out these stale entries asynchronously upon read requests. For example, data entries in a first table may be deleted based on a delete request, but an association stored in a second table may continue to exist in storage. Rather than spending time and processing resources to check whether the association is still valid in the first table following each deletion, the non-relational database may check the validity of an association when receiving a read request for that association.

For example, the data entry may be deleted from a second table. Upon receiving the read request, the system 100 may search in a first table for the association corresponding to the primary key index indicated in the read request regardless of if the data entry was previously deleted in the second table.

The system 100 may then search for an association corresponding to the primary key index and the data entry in a second table. That is, in conventional systems, the system 100 may spend time and processing resources to check whether the association is still valid in the first table following each deletion in the second table.

When the non-relational database receives a read request for an association (e.g., indexed by primary key index), and the database identifies that this particular association no longer exists in the first table (e.g., based on a prior delete), the database may then delete the requested association from memory. By deleting the requested association from memory, processing resources and time may be saved by not performing frequent data lookups during deletion operations, while still returning accurate data to users for read requests.

That is, the latency and resource overhead associated with the database may also increase because the second table may be checked every time the database system receives a read request indicating the primary key index. In conventional systems, the database may not delete the association in the first table when the data entry corresponding to the primary key index is determined to be deleted, increasing latency and resource overhead, and compromising the efficiency of the database.

To efficiently and securely handle this volume of stored data, the system 100 may implement a procedure to delete the association in the first table in response to determining that the last data entry in the second table that is indexed with the data entry corresponding to the primary key index in the first table is deleted. This may reduce the load on the database (e.g., by reducing the number of database operations for searching for the association), as the database may delete the association in the first table if the association in the second table is deleted. By performing the asynchronous deletion at the database, the load on the database may decrease resulting in a streamlined process at the database.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
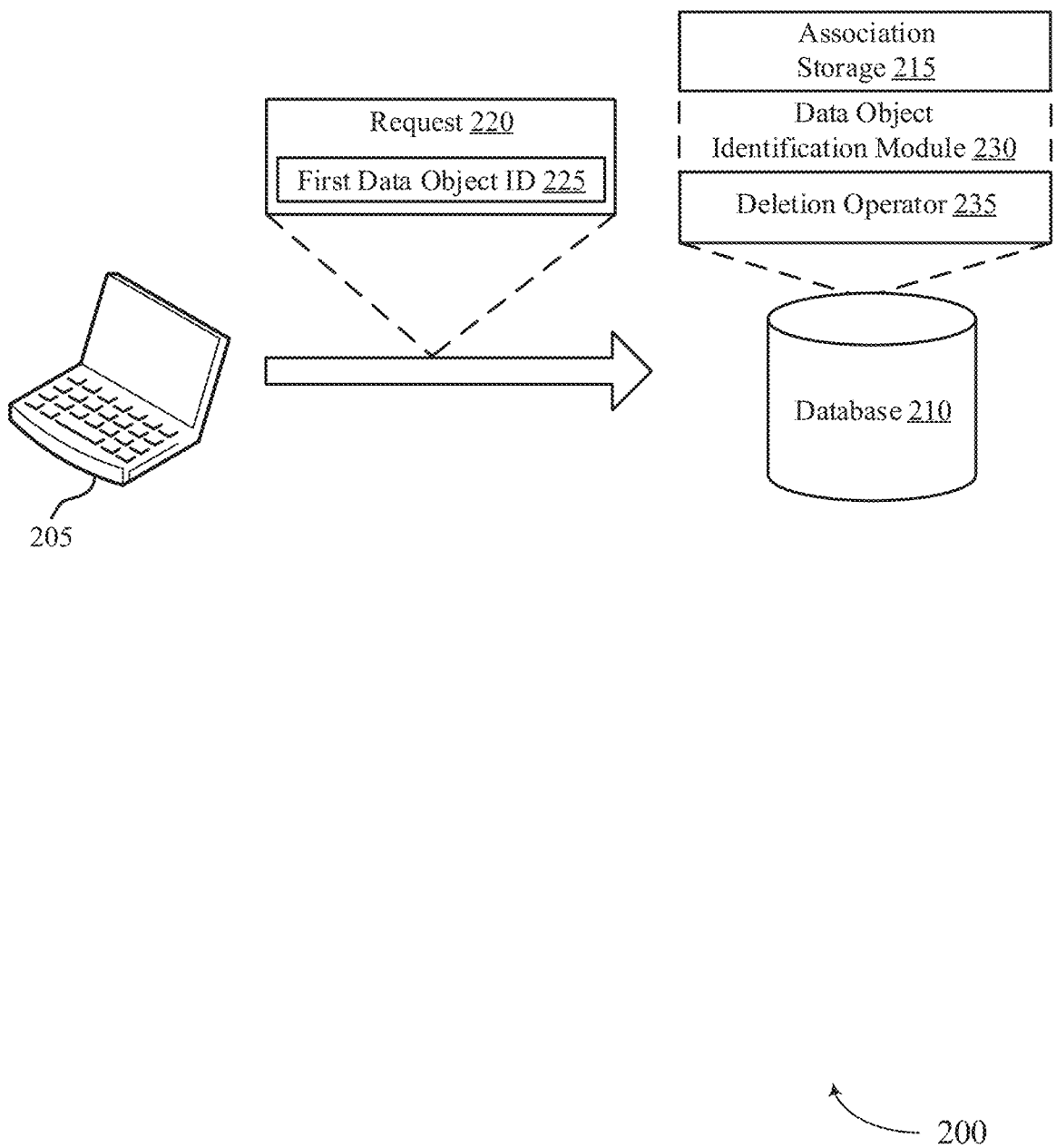
FIGS. 2 through 4 illustrate examples of systems that supports asynchronous deletion in non-relational databases in accordance with aspects of the present disclosure.

FIG. 2 illustrates an example of a system 200 that supports asynchronous deletion in non-relational databases in accordance with aspects of the present disclosure. The system 200 may include a user device 205 and a database 210. The user device 205 and the database 210 may be components of the subsystem 125, as described with reference to FIG. 1. For example, the user device 205 may be an example of a cloud client 105 and the database 210 may be a component of the data center 120.

The database 210 may contain an association storage 215 for storing one or more associations (e.g., data object associations). A data entry may be associated with a primary key index used to search for the data entry in database 210. In some cases, each association may correspond to an association stored in a relational database (e.g., an object relational index). In some examples, the one or more associations may be an example of an association between user activities and data objects. For example, a user activity may include sending or receiving emails, accepting calendar events, sending or receiving short message service (SMS) text messages, sending or receiving voice calls, posting or interacting with social media messages, or a combination thereof. Data objects may include contacts, accounts, organizations, cases, opportunities or a combination thereof.

The user device 205 may be associated with or in communication with the database 210. In some cases, an application server may be associated with the database 210. The user device 205 may have access to data stored in database 210, and may manage requests for this data. The database 210 may receive requests for this data from one or more user devices 205 within a database system. In some cases, the database 210 receives a request 220 or a message from a user device 205. For example, request 220 may be a read request. The read request may include a first data object ID 225 (e.g., a primary key index). The first data object ID 225 may be used to search data entries associated with the first data object in the database 210.

The database 210 may additionally contain a data object identification module 230. In some cases, the data object identification module 230 may identify a second data object (e.g., a data entry) according to a stored association (e.g., a first data object association) that is indexed with the first data object ID 225. As discussed below in further detail, the database 210 may locate in a first table within the database 210 the first data object ID 225 indicated in the request 220. The data object identification module 230 may then identify the data entry (e.g., the second data object) corresponding to the first data object due to the stored association between the first data object and the second data object. The database 210 may then locate in a second table within database 210 the second data object associated with the first data object ID 225.

The database 210 may contain a deletion operator 235. For example, the deletion operator 235 may determine that a last data entry indexed with the second data object has been deleted from the database 210. The last data entry indexed with the second data object may be associated with the first data object ID 225. The deletion operator 235 may also delete the association (e.g., first data object association) between the first data object and the second data object in the database 210 according to receiving the request 220 and determining the last data entry indexed with the second data object has been deleted.

Figure 3:
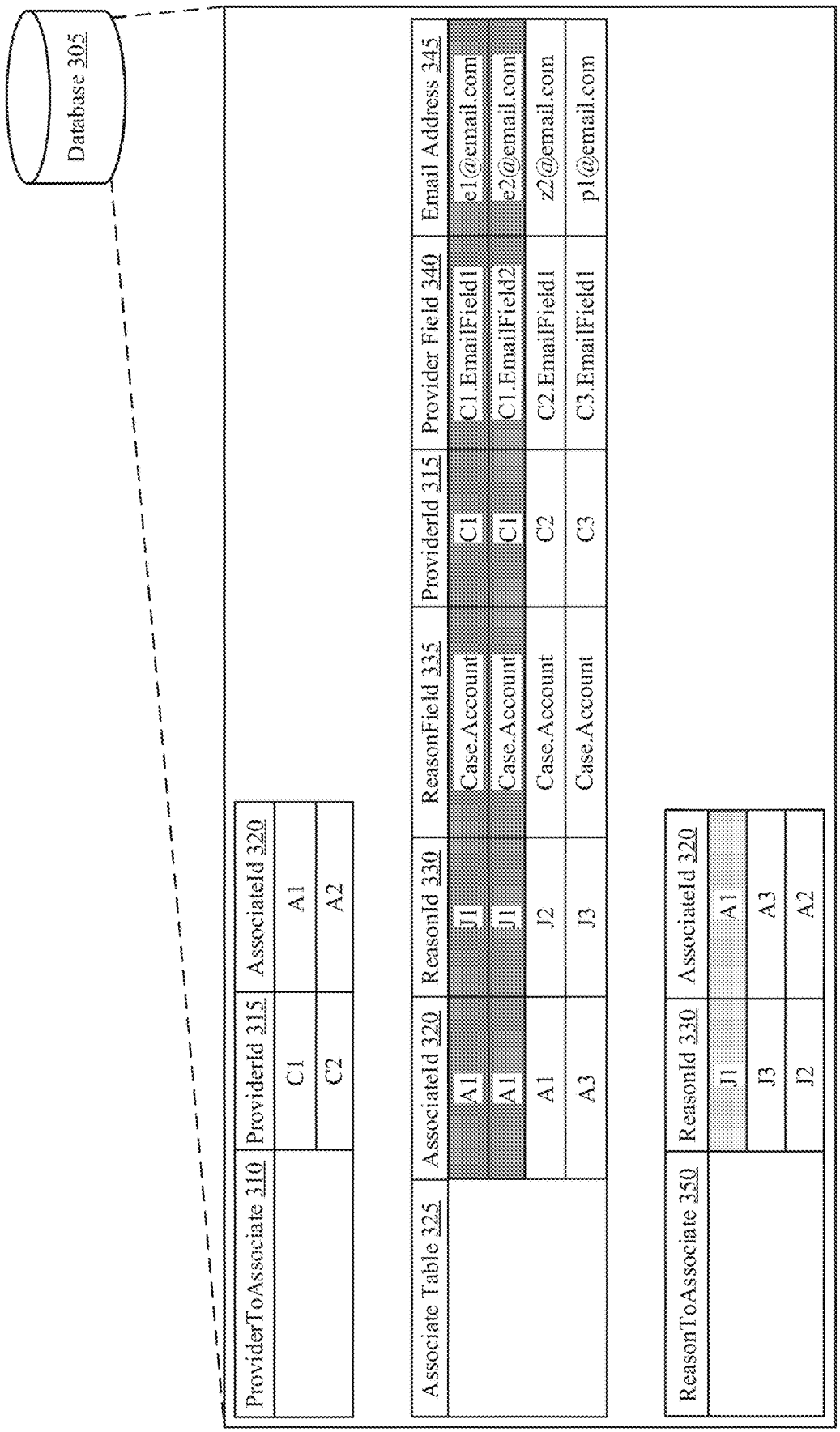

FIG. 3 illustrates an example of a system 300 that supports asynchronous deletion in non-relational databases in accordance with aspects of the present disclosure. The system 300 may include a database 305, a provider to associate table 310, an associate table 325, and a reason to associate table 350. Database 305 may be an example of the corresponding device described with respect to FIGS. 1 and 2. The system 300 may illustrate one possible implementation of asynchronous deletion in non-relational databases at database 305. However, it is to be understood that other possible storage frameworks may be implemented to support asynchronous deletion in non-relational databases.

The database 305 may be an example of a non-relational database configured to store one or more data object associations (e.g., a plurality of data object associations) in separate tables. As discussed below in further detail, the data object associations may correspond to an association (e.g., a data object relational index) stored in a relational database.

The database 305 may store one or more data objects and corresponding associations in a provider to associate table 310. For example, the provider to associate table 310 may include a provider ID 315 (e.g., a data object identifier) and an associate ID 320 (e.g., a data object identifier). The provider ID 315 and the associate ID 320 may include data objects that may be examples of contacts, accounts, organizations, cases, opportunities, or a combination thereof. For example, data object C1 of the provider ID 315 may be associated with data object A1 of the associate ID 320. Data object C2 of the provider ID 315 may be associated with data object A2 of the associate ID 320.

In some examples, the data object associated with the associate ID 320 may only be accessed through the provider ID 315. That is, data object C1 of the provider ID 315 may be an example of a primary key index (e.g., a first data object identifier) in the provider to associate table 310. For example, to the access information associated with data object A1 of the associate ID 320, the database 305 may receive a read request indicating data object C1 of the provider ID 315. Because the data object association between data object C1 and data object A1 is stored in the database 305, the database 305 may be able to access the information associated with data object A1 via data object C1. That is, the database 305 does not maintain relational integrity, and the information associated with the associate 320 may only be accessed through the primary key index (e.g., provider ID 315).

The database 305 may store one or more data objects and corresponding associations in an associate table 325. To create the associate table 325, the data entries in the provider to associate table 310 may be replicated and copied into a separate table (e.g., associate table 325). For example, the database 305 may copy the data entries in the provider to associate table 310 to create a new table and set the associate ID 320 as the primary key index. In that way, data entries may be accessed via the primary key index (e.g., associate ID 320) in the associate table 325.

In some examples, the associate table 325 may include data object identifiers such as the associate ID 320, a reason ID 330, a reason field 335, the provider ID 315, a provider field 340, and an email address 345. The associate ID 320, the reason ID 330, the reason field 335, the provider ID 315, the provider field 340, and the email address 345 may include data objects that may be examples of contacts, accounts, organizations, cases, opportunities, or a combination thereof. For example, data object e1@email.com of the email address 345 may be associated with data object A1 of the associate ID 320. In some cases, data object e2@email.com of the email address 345 may also be associated with data object A1 of the associate ID 320.

In some cases, the data object associated with the email address 345 may only be accessed through the associate ID 320. That is, data object A1 of the associate ID 320 may be an example of a primary key index (e.g., a first data object identifier) in the associate table 325. For example, to access information associated with data object e1@email.com of the email address 345, the database 305 may receive a read request indicating data object A1 of the associate ID 320. Because the data object association between data object e1@email.com and data object A1 is stored in the database 305, the database 305 may be able to access the information associated with data object e1@email.com via data object A1. That is, the database 305 does not maintain relational integrity and the information associated with the email address 345 may only be accessed through the primary key index (e.g., associate ID 320).

The database 305 may store one or more data objects and corresponding associations in a reason to associate table 350. To create the reason to associate table 350, the data entries in the associate table 325 may be replicated and copied into a separate table (e.g., reason to associate table 350). For example, the database 305 may copy the data entries in the associate table 325 to create a new table and set the reason ID 330 as the primary key index. In that way, data entries may be accessed via the primary key index (e.g., reason ID 330) in the reason to associate table 350.

In some examples, the reason to associate table 350 may include the reason ID 330 and the associate ID 320. The reason ID 330 and the associate ID 320 may include data objects that may be examples of contacts, accounts, organizations, cases, opportunities, or a combination thereof. For example, data object A1 of the provider ID 315 may be associated with data object J1 of the associate ID 320. In some cases, data object A3 of the provider ID 315 may be associated with data object J3 of the reason ID 330.

In some examples, the data object associated with the associate ID 320 may only be accessed through the reason ID 330. That is, data object J1 of the reason ID 330 may be an example of a primary key index (e.g., a first data object identifier) in the provider to associate table 310. For example, to access information associated with data object A1 of the associate ID 320, the database 305 may receive a read request indicating data object J1 of the provider ID 315. Because the data object association between data object J1 and data object A1 is stored in the database 305, the database 305 may be able to access the information associated with data object A1 via data object J1. That is, the database 305 does not maintain relational integrity and the information associated with the associate ID 320 may only be accessed through the primary key index (e.g., reason ID 330).

A user device may request access to files associated with data object e1@email.com of email address 345 in the associate table 325. The email address 345 of data object e1@email.com may be associated with A1 of associate ID 320. In that case, to access data object e1@email.com of email address 345, the database 305 may receive a read request indicating data object A1 of associate ID 320. That is, data object A1 may be an example of a primary index key in the associate table 325 to access a data entry (e.g., e1@email.com) corresponding data object A1.

In other examples, when a user device requests access to files associated with data object e1@email.com of email address 345 in the associate table 325, the database 305 may receive a read request indicating data object J1 (e.g., a first data object identifier) of reason ID 330. For example, the read request may include a query for data corresponding to data object J1. In that case, the database may identify that data object A1 (e.g., a second data object identifier) of the associate ID 320 may be associated with data object J1. The relationship between data object J1 and data object A1 may be an example of a first data object association. The database 305 may then access the files associated with data object e1@email.com of email address 345 by searching the data entries in the associate table 325 using the first data object association. For example, the database 305 may locate the first data object association between data object J1 and data object A1 to access the files associated with e1@email.com of email address 345.

In that case, a data object may not directly be associated with a data entry of interest (e.g., email address 345). For example, when the database 305 receives a read request indicating data object J1, data object J1 may not directly indicate the email address 345 associated with data object J1. In that case, data object J1 may be indirectly associated with the email address 345 via the associate ID 320.

In some cases, the database 305 may receive a request to delete a data entry in the associate table 325. For example, data object e1@email.com of email address 345 may be deleted from associate table 325 based on a contact or account deleted from the system (e.g., leaving a company, changing account information, etc.). In that case, the data entry row including data object e1@email.com of the email address 345 may be deleted.

The database 305 may receive a read request indicating data object J1 of reason ID 330 (e.g., primary key). In that case, the database may identify that data object A1 of the associate ID 320 may be associated with data object J1 using the reason to associate table 350 (e.g., second primary key table). The database 305 may then search for data object A1 of the associate ID 320 (e.g., primary key) in the associate table 325 (e.g., first primary key table) where data object J1 of the reason ID 330 is associated with data object A1 of the associate ID 320. The database 305 may then determine the first data entry (e.g., including data object e1@email.com of email address 345) is deleted from the associate table 325. The database 305 may then search for the next available data entry including the association between data object A1 and data object J1 (e.g., first data object association).

In some examples, data entries including the association between data object A1 and data object J1 may be absent from the associate table 325. For example, data object e2@email.com of email address 345 may be deleted from associate table 325 in addition to data object e1@email.com of email address 345 may be deleted. If the database 305 receives a read request indicating data object J1 of reason ID 330, the database 305 may associate data object A1 with data object J1 in the reason to associate table 350. The database 305 may then search the associate table 325 for the association between data object J1 and data object A1. In this example, the database may determine that the association between data object J1 and data object A1 does not exist in the associate table 325. In that case, the database 305 may delete the association between data object J1 and data object A1 in the reason to associate table 350. In some cases, the database 305 may transmit an indication that queried data related to the association between data object J1 and data object A1 does not exist in the database 305.

Figure 4:
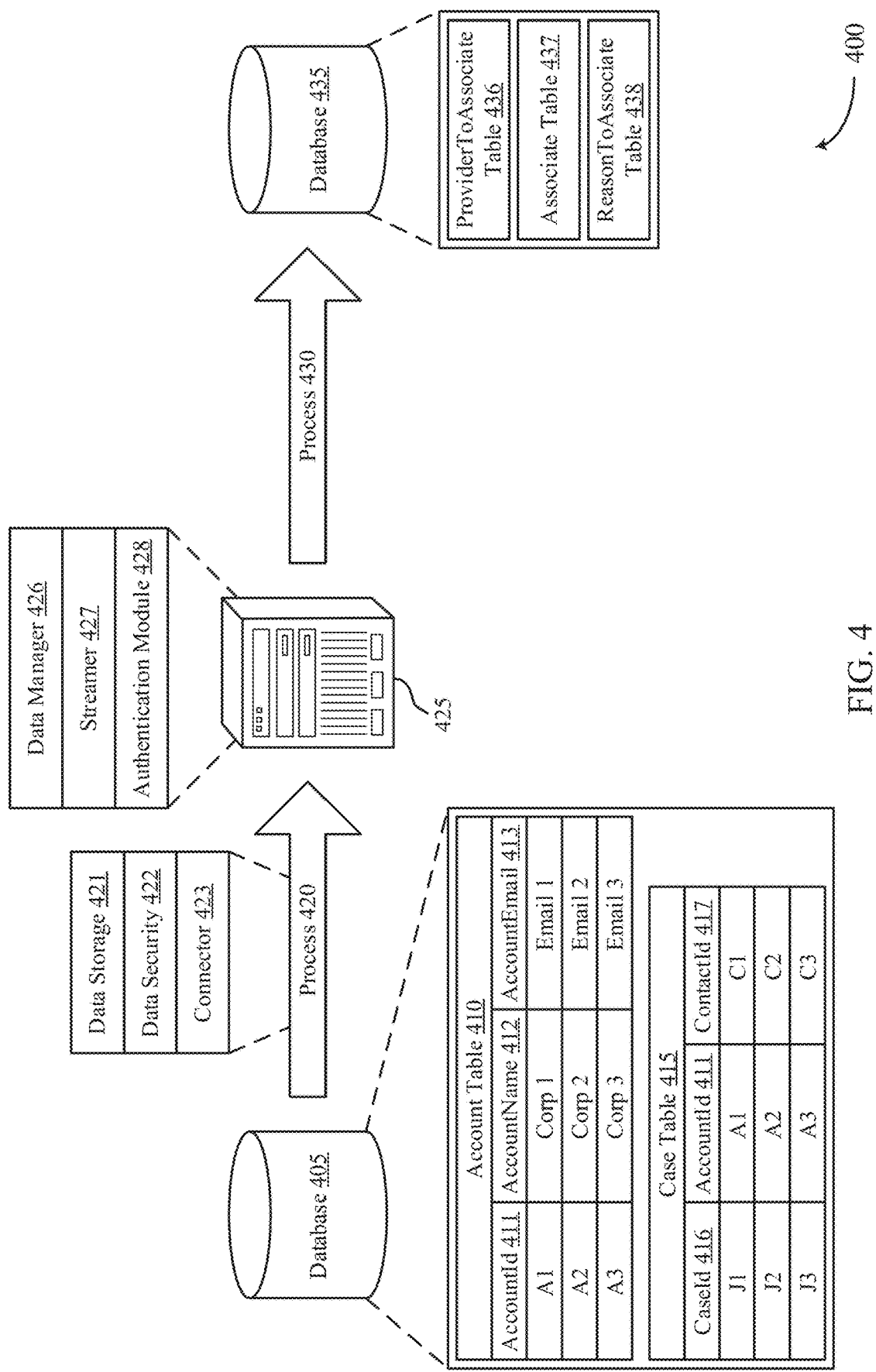

FIG. 4 illustrates an example of a system 400 that supports asynchronous deletion in non-relational databases in accordance with aspects of the present disclosure. The system 400 may include a database 405, an application server 425, and a database 435, which may be examples of the corresponding devices described with respect to FIGS. 1 through 3. The system 400 may illustrate one possible implementation of asynchronous deletion in non-relational databases at database 435. However, it is to be understood that many other possible storage frameworks may be implemented to support asynchronous deletion in non-relational databases.

The database 405 may be an example of a relational database. For example, database 405 may be a relational database management system (RDBMS). The database 405 may store one or more data objects and corresponding associations (e.g., data object relational index) in a case table 415. The case table 415 may include a case ID 416, an account ID 411, and a contact ID 417. The case ID 416, the account ID 411, and the contact ID 417 may include data objects that may be examples of contacts, accounts, organizations, cases, opportunities, or a combination thereof. For example, data object A1 of the account ID 411 may be associated with data object J1 of the case ID 416 and data object C1 of the contact ID 417. In other examples, data object C1 of contact ID 417 may be associated with data object J1 of the case ID 416.

In the case of database 405, each data entry (e.g., data objects J1, A1, C1, etc.) may be accessed by directly searching the data entry of interest. For example, the data entries of contact ID 417 may be accessed by searching via the case ID 416 or the account ID 411. That is, database 405 may include relational integrity. When a data entry is entered in the case table 415, the data entry may be associated with each data entry in the case table 415. In other examples, when a data entry is deleted from the case table 415, the data entry may be deleted from other tables separate from the case table 415 (e.g., contact table, account table, etc.)

In some cases, the database 405 may include an account table or a contact table. For example, the contact table (not shown) may include the contact ID 417, a first email field, a second email field, and the account ID 411. In some case, the primary identifier (e.g., data entry of interest) may be the email address included in the first or second email field. In this case, the email address may be linked to one or more CRM records (e.g., contact ID 417, account ID 411). That is, the CRM record may be directly associated with the activity of the user. In some cases, the contact ID 417 may represent a user associated with the user device.

In some cases, an account (e.g., the account ID 411) may be created to associate the contact (e.g., contact ID 417) with the account in an account table. In that case, the account may be created prior to associating the contact with the account. To create the case table 415, the account ID 411 and the contact ID 417 may already be associated with each other. In some examples, additional data entries may be added to the case table 415. For example, a new data entry including data object J4 of case ID 416, data object A1 of account ID 411, and data object C1 of contact ID 417 may be added.

As described below in further detail, a new data entry including the association between data object J4 and data object A1 may be created in a reason to associate table 438. If the association between data object C1 and data object A1 already exists in the database 435, then the database 435 may refrain from adding the association between data object C1 and data object A1. In some examples, additional data entries may be added to the case table 415. In some examples, a new data entry including data object J5 of case ID 416, data object A5 of account ID 411, and data object C5 of contact ID 417 may be added in the case table 415. In that case, new associations between data object J5 of case ID 416, data object A5 of account ID 411, and data object C5 of contact ID 417 may be created in the database 435.

In conventional systems, the database 405 may manually associate the activities and the data objects (e.g., case ID 416, account ID 411, contact ID 417, etc.). In that case, a task or email may be created in the database 405 where the task or email may be directly linked to data object. To efficiently and securely handle the volume of associations in the database 405, the system 400 may automatically derive the relationships and associate the activities to the objects without manual intervention from the user.

Considering the large volume of data and the query pattern, the data stored in database 405 may be transmitted for storage in a database 435. Database 435 may be an example of a non-relational database. In this case, the data stored in database 405 may be stored in a de-normalized format in the database 435. To do this, the data stored in database 405 may be sent to the application server 425 via a process 420. Process 420 may include a data storage module 421, a data security module 422 (e.g., a TXO), and a connector 423. The connector may initially authenticate the via a login procedure.

The application server 425 may include a data manager 426, a streamer 427, and an authentication module 428. For example, the streamer 427 may be an example of a sequence of data or data packets used to transmit or receive information that is in the process of being transmitted. In some cases, the authentication module 428 may confirm the user has access to database 435, thereby completing the login procedure initiated at the connector 423.

The application server 425 may transmit the data to the database 435 via process 430. In some cases, process 430 may include an event streaming system and a continuous message processor. For example, the event streaming system may stream events in an application and then transfer those events to a different application where the different application processes the data and sends aggregates to a real-time dashboard. In this way, the event steaming system may connect an event provider with many event customers. The continuous message processor may distribute code around a cluster, assign tasks to machines, and monitor failure events. In addition, the continuous message processor may create a graph of computation (e.g., a topology) to transform a stream of one type of user activity (e.g., text message) to a different type of user activity (e.g., posting with social media message).

The database 435 may receive the data transmitted from the database 405. The database 435 may be an example of a non-relational database. For example, database 435 may be a nonrelational (e.g., a NoSQL) database. Database 435 may include a reason to associate table 438, which may be an example of the corresponding table described with respect to FIG. 3. In some cases, database 435 may include a provider to associate table 436, an associate table 437, or both, which may be examples of the corresponding tables described with respect to FIG. 3

In some cases, the data entries in the case table 415 in the database 405 may be stored in a de-normalized format in the database 435. For example, the relational integrity in database 405 may not be maintained at the database 435. That is, the data entries in database 435 may only be searched via the primary key index for each table. The data entries in case table 415 may be stored differently in the database 435. For example, the information included in each data entry in the case table 415 may be the same information included in each data entry in the reason to associate table 438; however, the associations and relationships between the data entries may differ. In that case, the data entries may be stored in separate tables and divided so that each primary key index assigned to a data entry in the database 435 may correspond to a relationship present in the database 405.

Figure 5:
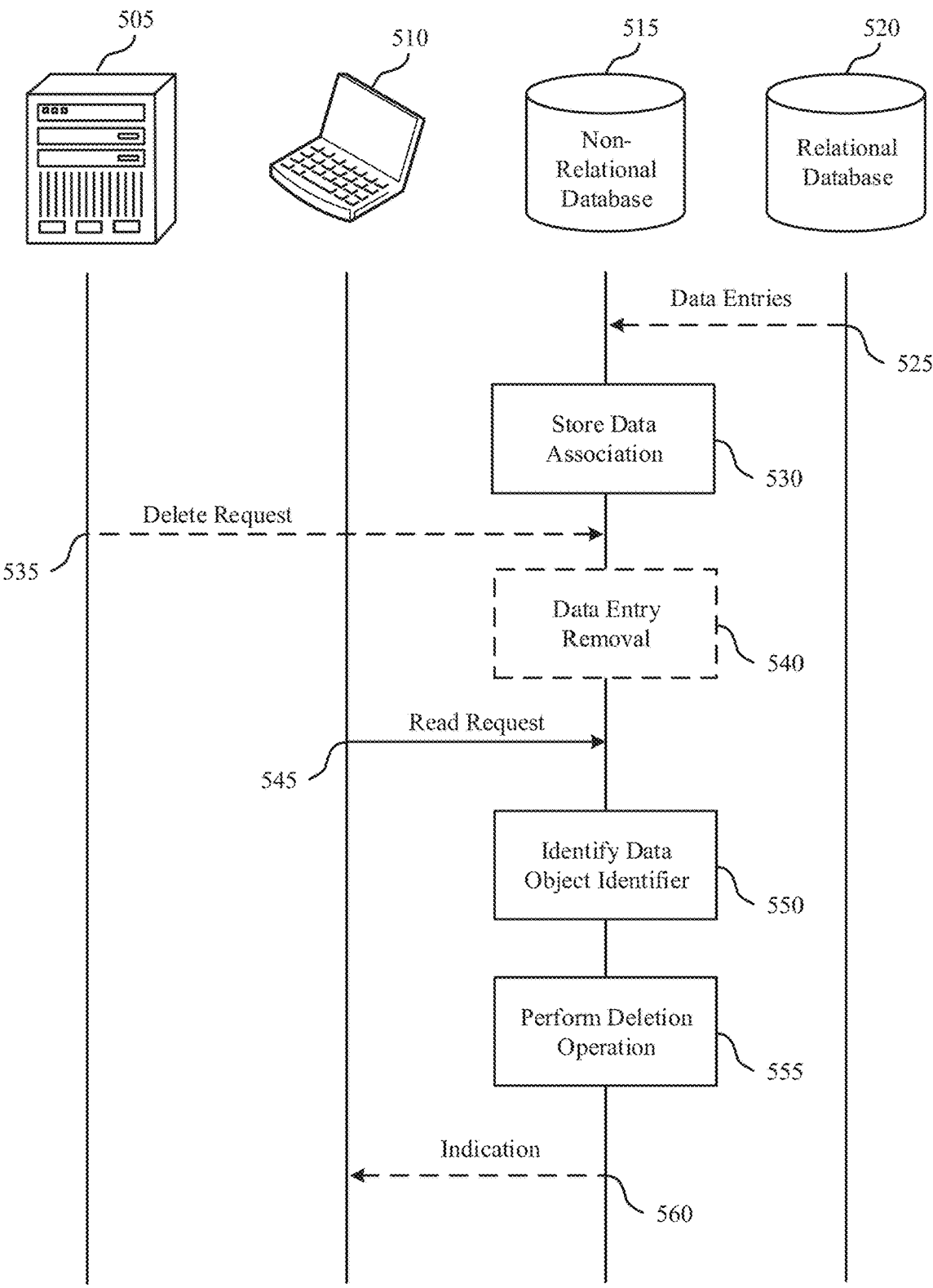
FIG. 5 illustrates an example of a process flow that supports asynchronous deletion in non-relational databases in accordance with aspects of the present disclosure.

FIG. 5 illustrates an example of a process flow 500 that supports asynchronous deletion in non-relational databases in accordance with aspects of the present disclosure. The process flow 500 may include an application server 505, a user device 510, a database 515, and a database 520. The application server 505, user device 510, and the database 520 may be examples of the corresponding devices described with respect to FIGS. 2 through 4. Alternative examples of the following may be implemented, where some steps are performed in a different order than described or not performed at all. In some cases, steps may include additional features not mentioned below, or further steps may be added.

At 525, the database 520 may transmit one or more data entries to the database 515. The database 520 may be an example of a relational database, and the database 515 may be an example of a non-relational database. The one or more data entries may correspond to an association (e.g., data object relational index) stored in the database 520. The transmission of one or more data entries to the database 515 may be an example of a data migration or data replication procedure from the database 520 to the database 515.

At 530, the database 515 may store one or more data associations. For example, the database 515 may store a plurality of data associations (e.g., data object associations) that correspond to the association stored in database 520 (e.g., data object relational index). For example, the database 515 may store a data object association indexed with a first primary key (e.g., first data object identifier) and indicating a data entry (e.g., second data object identifier). At 530, the database 515 may also store one or more data entries (e.g., email addresses, contacts, etc.).

In some cases, storing the data associations may include searching at the database 515 whether the data association includes the association between the first primary key index and indicates the data entry. In some examples, storing the data associations at 530 may be based on a maximum number of indices supported for the data entries in database 515.

At 535, the application server 505 may transmit a delete request. The database 515 may receive the delete request for a data entry. In some cases, the relational database 520 may receive the delete request from the application server 505 and may replicate the delete request to the non-relational database 515 (e.g., via a streaming application). In other cases, the database 515 may receive the delete request directly from the application server 505. The delete request may delete a last data entry indexed with the second data object identifier. At 540, the database 515 may delete the last entry from the memory of the database 515 based on receiving the delete request.

At 545, the user device 510 may transmit a read request. The database 515 may receive the read request. In some cases, the read request may indicate a primary key index (e.g., first data object identifier). The read request may request access to a data entry associated with the primary key index indicated in the read request. For example, the read request may include a query for data corresponding the primary key index.

At 550, the database 515 may identify one or more data objects. For example, the database 515 may identify a second data object associated with the primary key index indicated in the read request. The second data object may include the data entry associated with the primary key index. The second data object may be identified according to the stored data association and may be associated with the primary key index.

At 555, the database 515 may perform a deletion operation. For example, the database 515 may determine that a last data entry that is indexed with the identified second data object has been deleted from the database 515. In response to determining that the last data entry has been deleted and the read request, the database 515 may delete the association between the primary key index and the second data object in the database 515.

At 560, the database 515 may transmit an indication in response to determining that the last entry has been deleted and the read request. For example, the indication may indicate that the queried data included in the read request does not exist in the database 515.

Figure 6:
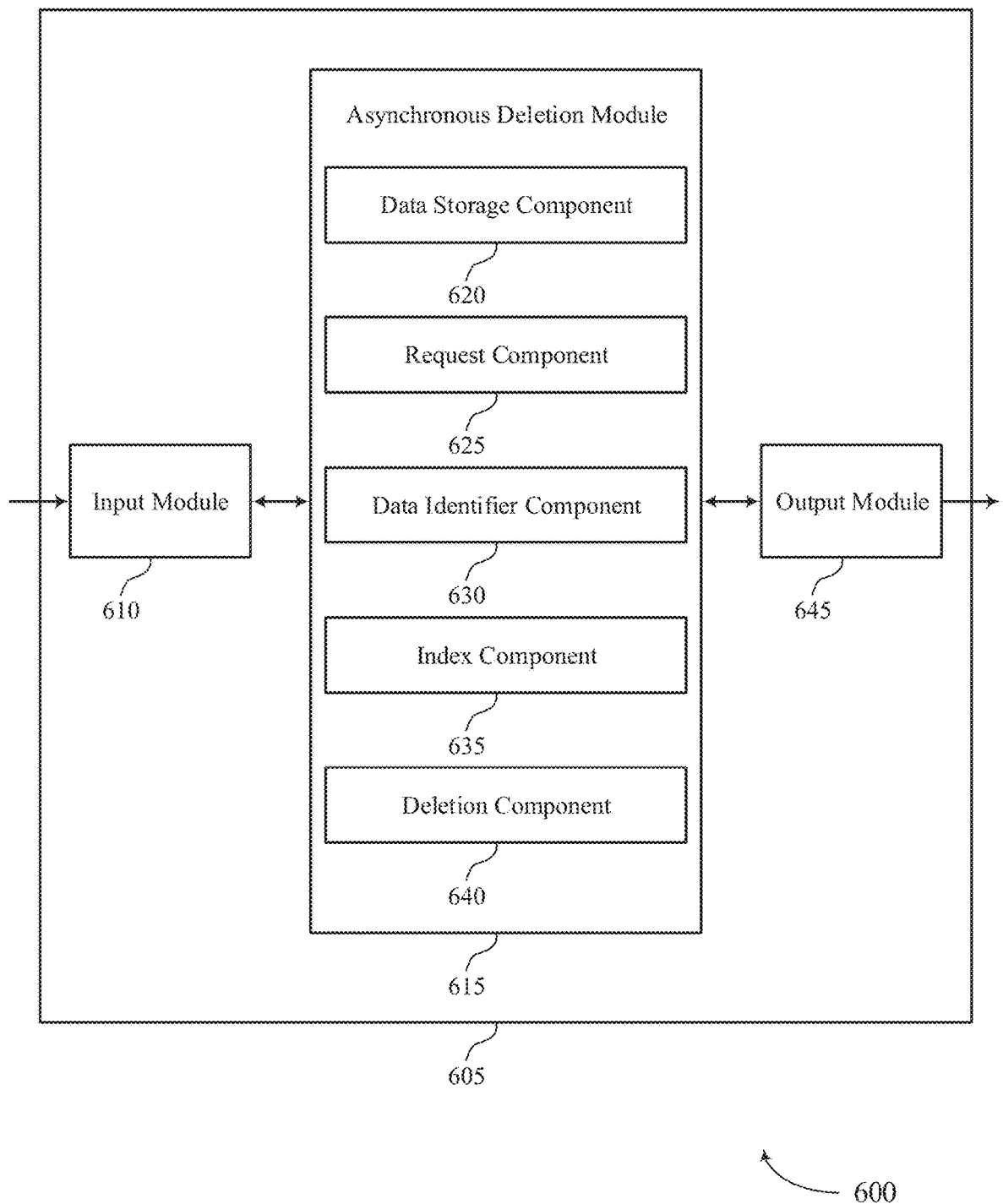
FIG. 6 shows a block diagram of an apparatus that supports asynchronous deletion in non-relational databases in accordance with aspects of the present disclosure.

FIG. 6 illustrates an example of a shows a block diagram 600 of an apparatus 605 that supports asynchronous deletion in non-relational databases in accordance with aspects of the present disclosure. The apparatus 605 may include an input module 610, an asynchronous deletion module 615, and an output module 645. The apparatus 605 may also include a processor. Each of these components may be in communication with one another (e.g., via one or more buses). In some cases, the apparatus 605 may be an example of an application server, a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the asynchronous deletion module 615 to support asynchronous deletion in non-relational databases. In some cases, the input module 610 may be a component of an input/output (I/O) controller 815 as described with reference to FIG. 8.

The asynchronous deletion module 615 may include a data storage component 620, a request component 625, a data identifier component 630, an index component 635, and a deletion component 640. The asynchronous deletion module 615 may be an example of aspects of the asynchronous deletion module 705 or 810 described with reference to FIGS. 7 and 8.

The asynchronous deletion module 615 and/or at least some of its various sub-components may be implemented in hardware, software executed by a processor, firmware, or any combination thereof. If implemented in software executed by a processor, the functions of the asynchronous deletion module 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The asynchronous deletion module 615 and/or at least some of its various sub-components may be physically located at various positions, including being distributed such that portions of functions are implemented at different physical locations by one or more physical devices. In some examples, the asynchronous deletion module 615 and/or at least some of its various sub-components may be a separate and distinct component in accordance with various aspects of the present disclosure. In other examples, the asynchronous deletion module 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The data storage component 620 may store, at the non-relational database, a set of data object associations, where each association of the set of data object associations corresponds to a data object relational index stored in a relational database. In some cases, the request component 625 may receive, at the non-relational database, a read request indicating a first data object identifier. The data identifier component 630 may identify a second data object identifier according to a first data object association of the stored set of data object associations that is indexed in the non-relational database with the first data object identifier. The index component 635 may determine that a last data entry that is indexed in the non-relational database with the identified second data object identifier and is associated with the first data object identifier has been deleted from the non-relational database. The deletion component 640 may delete the first data object association from the non-relational database in response to the read request and based on the determining.

The output module 645 may manage output signals for the apparatus 605. For example, the output module 645 may receive signals from other components of the apparatus 605, such as the asynchronous deletion module 615, and may transmit these signals to other components or devices. In some specific examples, the output module 645 may transmit output signals for display in a user interface, for storage in a database or data store, for further processing at a server or server cluster, or for any other processes at any number of devices or systems. In some cases, the output module 645 may be a component of an I/O controller 815 as described with reference to FIG. 8.

Figure 7:
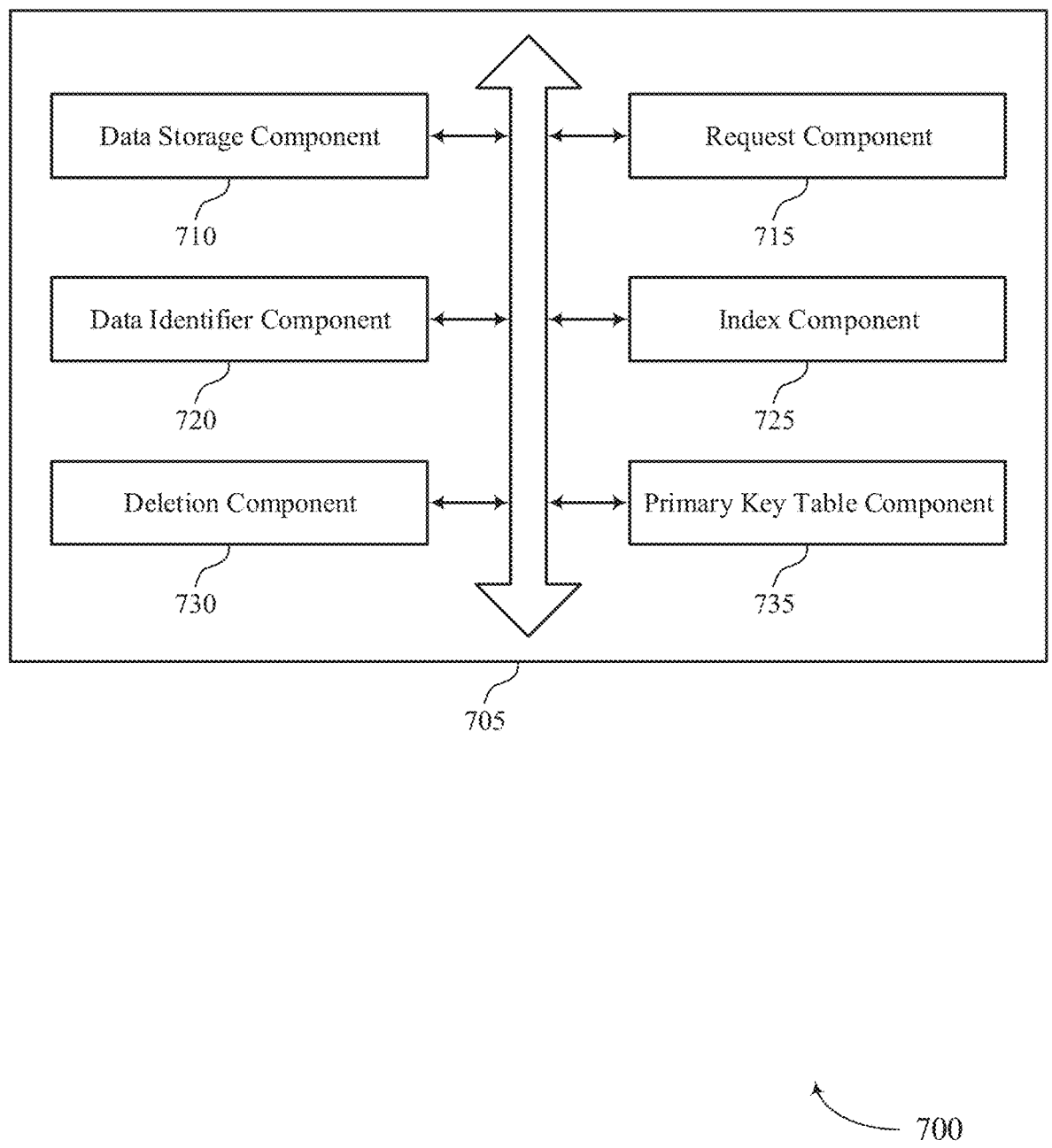
FIG. 7 shows a block diagram of an asynchronous deletion module that supports asynchronous deletion in non-relational databases in accordance with aspects of the present disclosure.

FIG. 7 shows a block diagram 700 of an asynchronous deletion module 705 that supports asynchronous deletion in non-relational databases in accordance with aspects of the present disclosure. The asynchronous deletion module 705 may be an example of aspects of an asynchronous deletion module 615 or an asynchronous deletion module 810 described herein. The asynchronous deletion module 705 may include a data storage component 710, a request component 715, a data identifier component 720, an index component 725, a deletion component 730, and a primary key table component 735. Each of these modules may communicate, directly or indirectly, with one another (e.g., via one or more buses). In some case, the asynchronous deletion module 705 may be a component of a non-relational database within a database system.

The data storage component 710 may store, at the non-relational database, a set of data object associations, where each association of the set of data object associations corresponds to a data object relational index stored in a relational database. In some examples, the data storage component 710 may store, in the non-relational database, one or more data entries that are indexed with the second data object identifier and are associated with the first data object identifier based at least in part on a data migration or data replication procedure from the relational database to the non-relational database. In some cases, the data storage component 710 may store, in the non-relational database, a data object association indexed with the first data object identifier and indicating the second data object identifier based at least in part on the data migration or data replication procedure.

In some cases, storing the data object association in the non-relational database may comprise the data storage component 710 searching the non-relational database for whether the plurality of data object associations comprises the data object association indexed with the first data object identifier and indicating the second data object identifier, wherein storing the data object association is based at least in part on the searching. In some cases, the non-relational database may comprise a plurality of distributed machines for data storage.

In some cases, the request component 715 may receive, at the non-relational database, a read request indicating a first data object identifier. In some cases, the request component 715 may receive, at the non-relational database, a delete request for the last data entry that is indexed in the non-relational database with the identified second data object identifier. In some cases, the read request may comprise a query for data corresponding to the first data object identifier. In some examples, the request component 715 may transmit, in response to the read request and based at least in part on the determining, an indication that the queried data does not exist in the non-relational database The data identifier component 720 may identify a second data object identifier according to a first data object association of the stored set of data object associations that is indexed in the non-relational database with the first data object identifier. In some cases, the plurality of data object associations comprises associations between user activities and data objects. In some examples, the user activities may comprise sending or receiving emails, accepting calendar events, sending or receiving short message service (SMS) text messages, sending or receiving voice calls, posting or interacting with social media messages, or a combination thereof, and the data objects may comprise customer relationship management (CRM) data objects comprising contacts, accounts, organizations, cases, opportunities, or a combination thereof.

The index component 725 may determine that a last data entry that is indexed in the non-relational database with the identified second data object identifier and is associated with the first data object identifier has been deleted from the non-relational database. In some cases, storing the data object association in the non-relational database may be based at least in part on a maximum number of indices supported for data entries in the non-relational database.

The deletion component 730 may delete the first data object association from the non-relational database in response to the read request and based on the determining. In some examples, the first data object association is deleted from the non-relational database asynchronous to removing the last data entry from the memory of the non-relational database, and a system performance metric of the non-relational database corresponding to the asynchronous deleting is greater than a system performance metric corresponding to a synchronous delete procedure. In some examples, the deletion component 730 may remove the last data entry from memory of the non-relational database based at least in part on the delete request.

The primary key table component 735 may include one or more data entries stored in a first primary key table of the non-relational database, where a primary key of the first primary key table may comprise a data object type of the second data object identifier. In some examples, the primary key table component 735 may include the data object association stored in a second primary key table of the non-relational database, where a primary key of the second primary key table may comprise a data object type of the first data object identifier.

Figure 8:
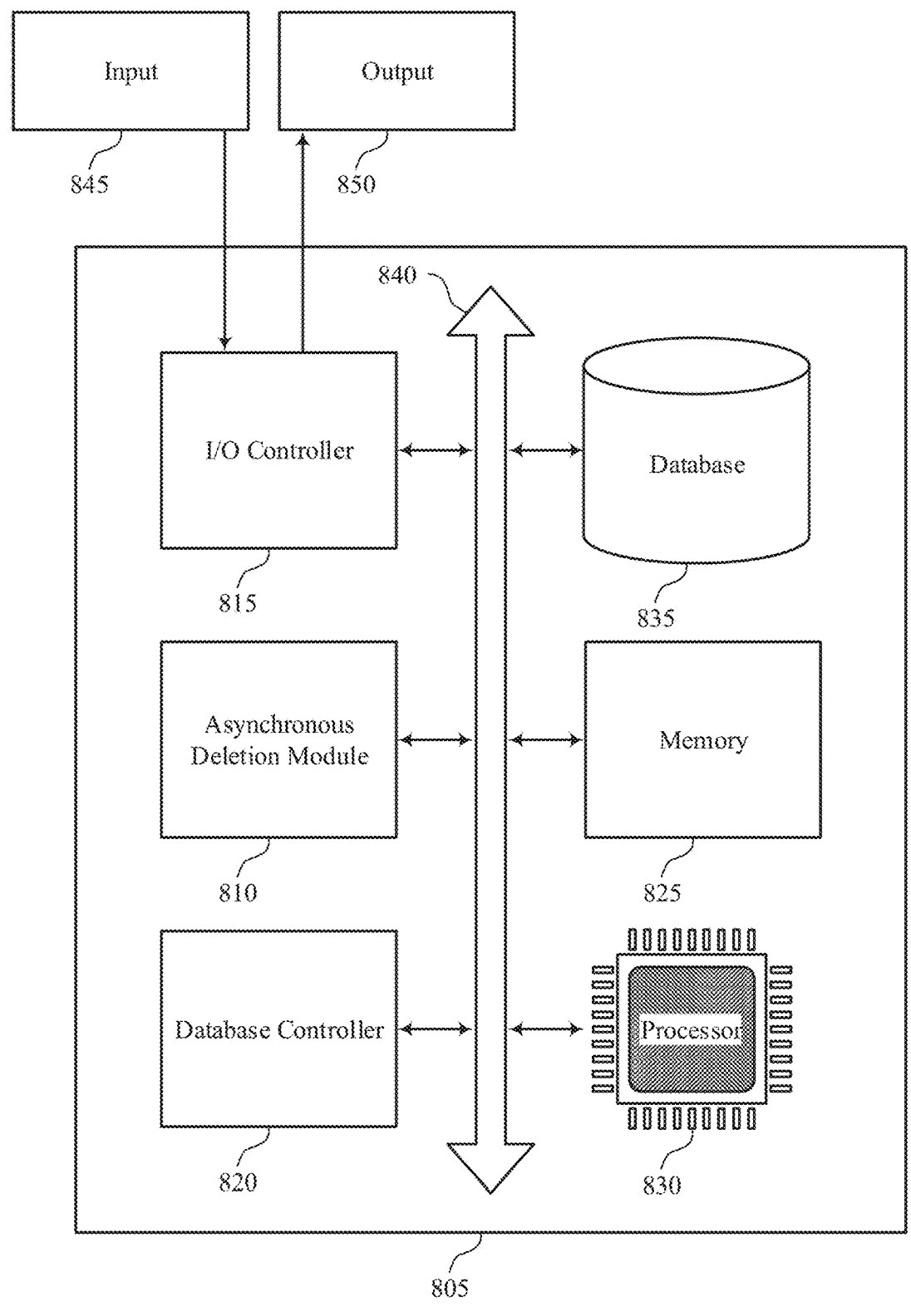
FIG. 8 shows a diagram of a system including a device that supports asynchronous deletion in non-relational databases in accordance with aspects of the present disclosure.

FIG. 8 shows a diagram of a system 800 including a device 805 that supports asynchronous deletion in non-relational databases in accordance with aspects of the present disclosure. The device 805 may be an example of or include the components of a database server or an apparatus 605 as described herein. The device 805 may include components for bi-directional data communications including components for transmitting and receiving communications, including an asynchronous deletion module 810, an I/O controller 815, a database controller 820, memory 825, a processor 830, and a database 835. These components may be in electronic communication via one or more buses (e.g., bus 840).

The asynchronous deletion module 810 may be an example of an asynchronous deletion module 615 or 705 as described herein. For example, the asynchronous deletion module 810 may perform any of the methods or processes described above with reference to FIGS. 6 and 7. In some cases, the asynchronous deletion module 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include RAM and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting user device validation at an application server).

Figure 9:
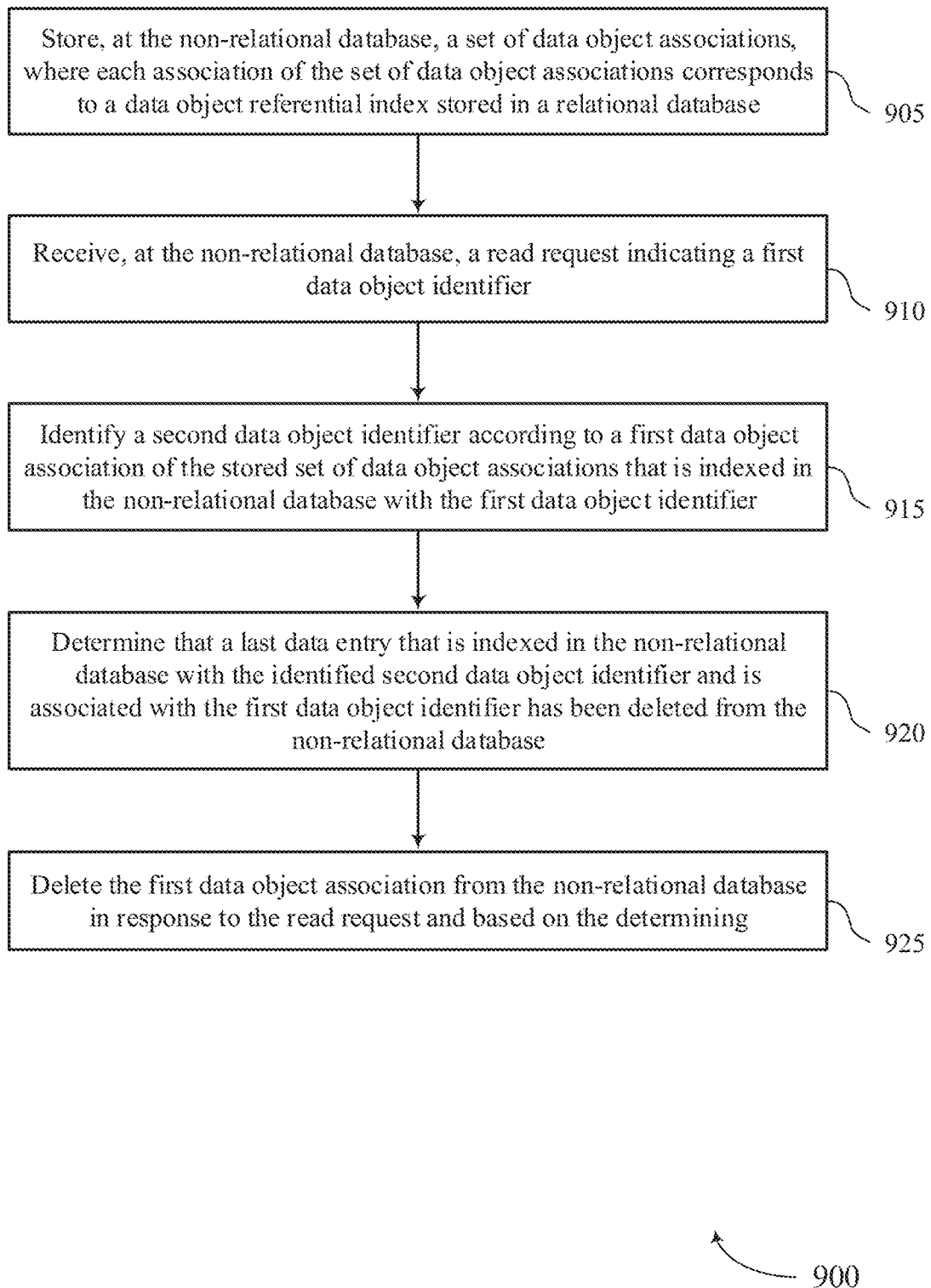
FIGS. 9 through 11 show flowcharts illustrating methods that support asynchronous deletion in non-relational databases in accordance with aspects of the present disclosure.

FIG. 9 shows a flowchart illustrating a method 900 that supports asynchronous deletion in non-relational databases in accordance with aspects of the present disclosure. The operations of method 900 may be implemented by a non-relational database or its components as described herein. For example, the operations of method 900 may be performed by an asynchronous deletion module as described with reference to FIGS. 6 through 8. In some examples, a non-relational database may execute a set of instructions to control the functional elements of the non-relational database to perform the functions described below. Additionally or alternatively, a non-relational database may perform aspects of the functions described below using special-purpose hardware.

At 905, the non-relational database may store, at the non-relational database, a set of data object associations, where each association of the set of data object associations corresponds to a data object relational index stored in a relational database. The operations of 905 may be performed according to the methods described herein. In some examples, aspects of the operations of 905 may be performed by a data storage component as described with reference to FIGS. 6 and 7.

At 910, the non-relational database may receive, at the non-relational database, a read request indicating a first data object identifier. The operations of 910 may be performed according to the methods described herein. In some examples, aspects of the operations of 910 may be performed by a request component as described with reference to FIGS. 6 and 7.

At 915, the non-relational database may identify a second data object identifier according to a first data object association of the stored set of data object associations that is indexed in the non-relational database with the first data object identifier. The operations of 915 may be performed according to the methods described herein. In some examples, aspects of the operations of 915 may be performed by a data identifier component as described with reference to FIGS. 6 and 7.

At 920, the non-relational database may determine that a last data entry that is indexed in the non-relational database with the identified second data object identifier and is associated with the first data object identifier has been deleted from the non-relational database. The operations of 920 may be performed according to the methods described herein. In some examples, aspects of the operations of 920 may be performed by an index component as described with reference to FIGS. 6 and 7.

At 925, the non-relational database may delete the first data object association from the non-relational database in response to the read request and based on the determining. The operations of 925 may be performed according to the methods described herein. In some examples, aspects of the operations of 925 may be performed by a deletion component as described with reference to FIGS. 6 and 7.

Figure 10:
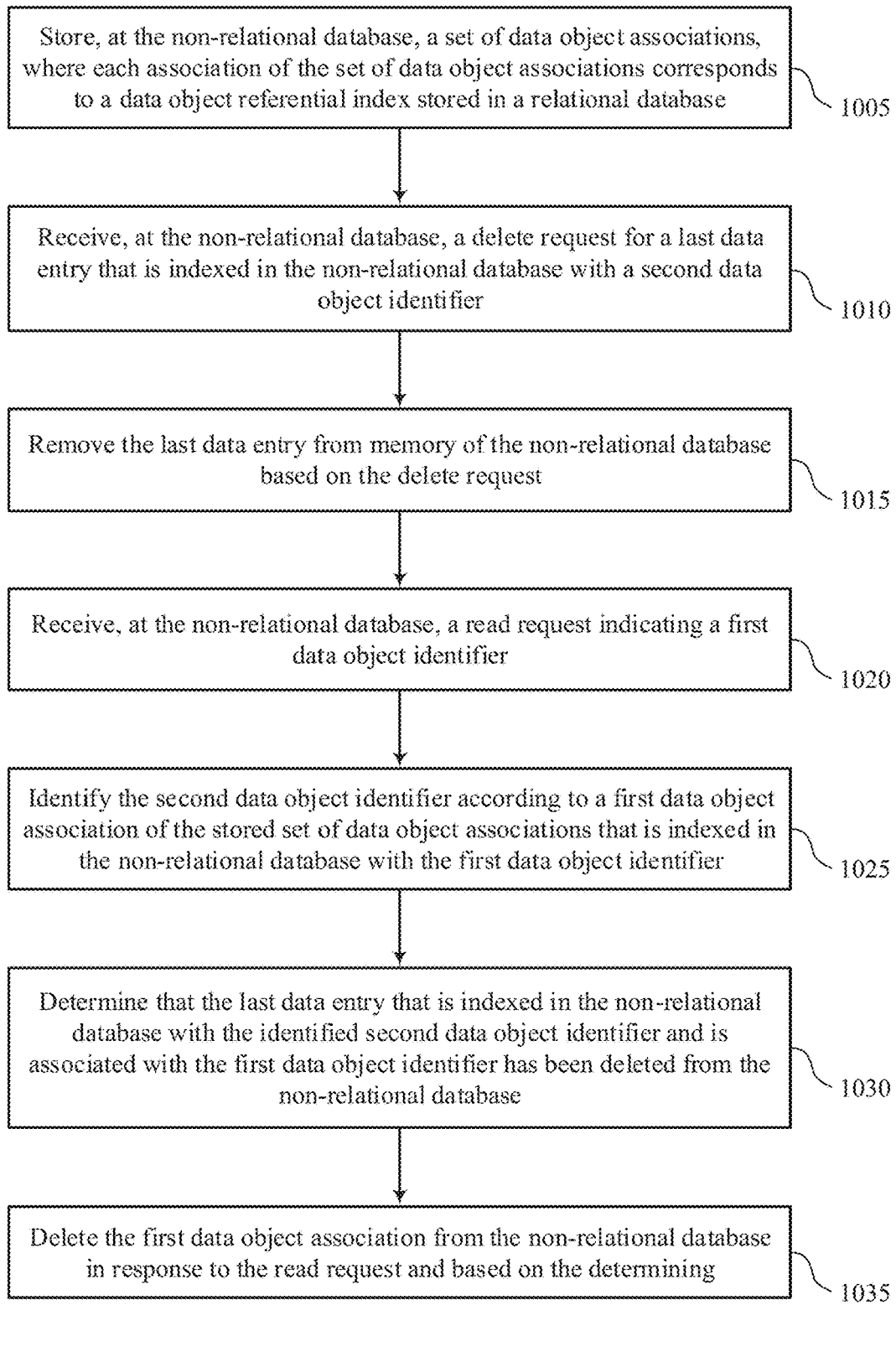

FIG. 10 shows a flowchart illustrating a method 1000 that supports asynchronous deletion in non-relational databases in accordance with aspects of the present disclosure. The operations of method 1000 may be implemented by a non-relational database or its components as described herein. For example, the operations of method 1000 may be performed by an asynchronous deletion module as described with reference to FIGS. 8 through 8. In some examples, a non-relational database may execute a set of instructions to control the functional elements of the non-relational database to perform the functions described bellow. Additionally or alternatively, a non-relational database may perform aspects of the functions described below using special-purpose hardware.

At 1005, the non-relational database may store, at the non-relational database, a set of data object associations, where each association of the set of data object associations corresponds to a data object relational index stored in a relational database. The operations of 1005 may be performed according to the methods described herein. In some examples, aspects of the operations of 1005 may be performed by a data storage component as described with reference to FIGS. 6 and 7.

At 1010, the non-relational database may receive, at the non-relational database, a delete request for the last data entry that is indexed in the non-relational database with the identified second data object identifier. The operations of 1010 may be performed according to the methods described herein. In some examples, aspects of the operations of 1010 may be performed by a request component as described with reference to FIGS. 6 and 7.

At 1015, the non-relational database may remove the last data entry from memory of the non-relational database based on the delete request. The operations of 1015 may be performed according to the methods described herein. In some examples, aspects of the operations of 1015 may be performed by a deletion component as described with reference to FIGS. 6 and 7.

At 1020, the non-relational database may receive, at the non-relational database, a read request indicating a first data object identifier. The operations of 1020 may be performed according to the methods described herein. In some examples, aspects of the operations of 1020 may be performed by a request component as described with reference to FIGS. 6 and 7.

At 1025, the non-relational database may identify a second data object identifier according to a first data object association of the stored set of data object associations that is indexed in the non-relational database with the first data object identifier. The operations of 1025 may be performed according to the methods described herein. In some examples, aspects of the operations of 1025 may be performed by a data identifier component as described with reference to FIGS. 6 and 7.

At 1030, the non-relational database may determine that a last data entry that is indexed in the non-relational database with the identified second data object identifier and is associated with the first data object identifier has been deleted from the non-relational database. The operations of 1030 may be performed according to the methods described herein. In some examples, aspects of the operations of 1030 may be performed by an index component as described with reference to FIGS. 6 and 7.

At 1035, the non-relational database may delete the first data object association from the non-relational database in response to the read request and based on the determining. The operations of 1035 may be performed according to the methods described herein. In some examples, aspects of the operations of 1035 may be performed by a deletion component as described with reference to FIGS. 6 and 7.

Figure 11:
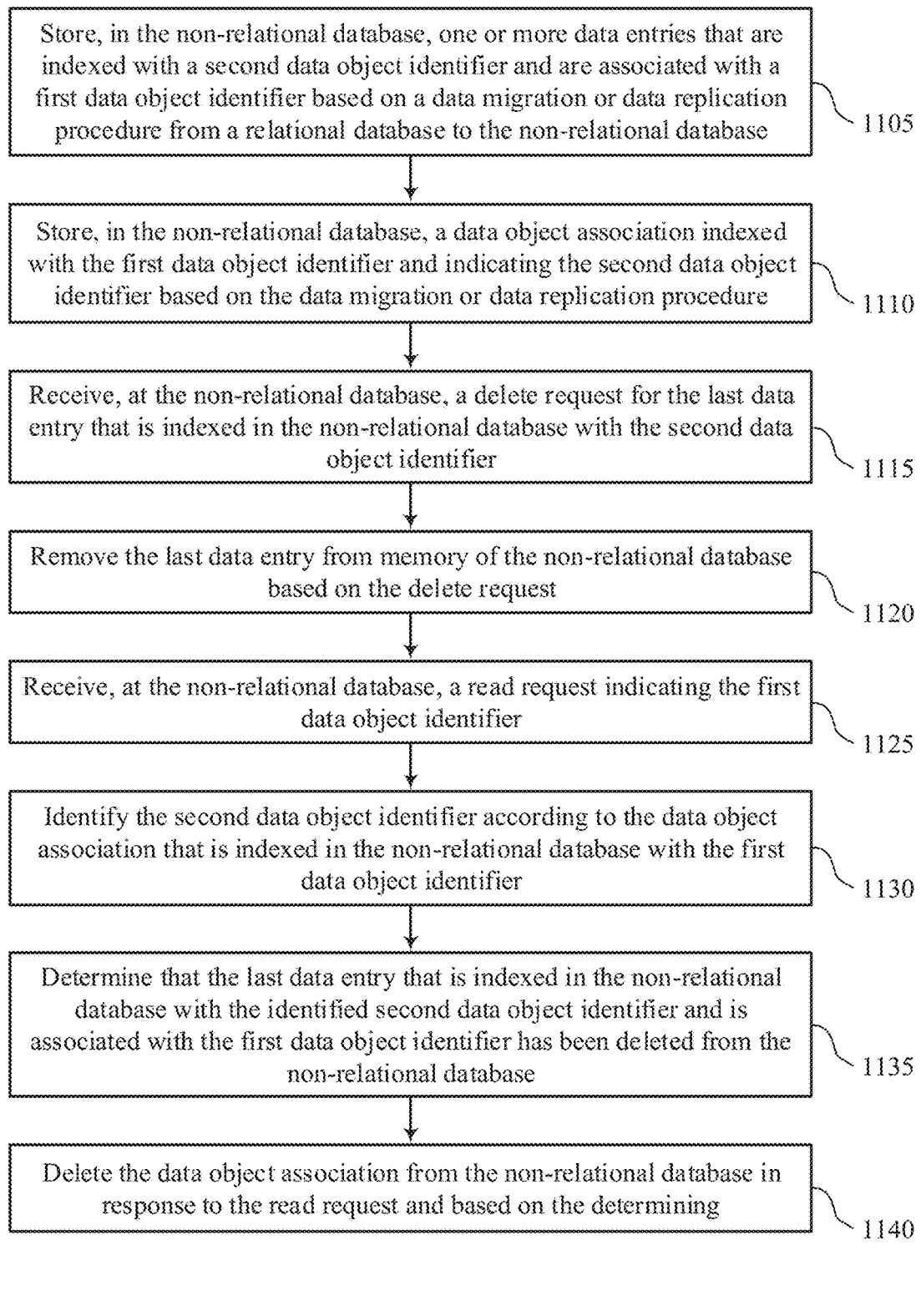

FIG. 11 shows a flowchart illustrating a method 1100 that supports asynchronous deletion in non-relational databases in accordance with aspects of the present disclosure. The operations of method 1100 may be implemented by a non-relational database or its components as described herein. For example, the operations of method 1100 may be performed by an asynchronous deletion module as described with reference to FIGS. 6 through 8. In some examples, a non-relational database may execute a set of instructions to control the functional elements of the non-relational database to perform the functions described below. Additionally or alternatively, a non-relational database may perform aspects of the functions described below using special-purpose hardware.

At 1105, the non-relational database may store, in the non-relational database, one or more data entries that are indexed with the second data object identifier and are associated with the first data object identifier based on a data migration or data replication procedure from a relational database to the non-relational database. The operations of 1105 may be performed according to the methods described herein. In some examples, aspects of the operations of 1105 may be performed by a data storage component as described with reference to FIGS. 6 and 7.

At 1110, the non-relational database may store, at the non-relational database, a set of data object associations, where each association of the set of data object associations corresponds to a data object relational index stored in the relational database. The operations of 1110 may be performed according to the methods described herein. In some examples, aspects of the operations of 1110 may be performed by a data storage component as described with reference to FIGS. 6 and 7.

At 1115, the non-relational database may receive, at the non-relational database, a delete request for the last data entry that is indexed in the non-relational database with the identified second data object identifier. In some cases, this delete request may originate at the relational database. The operations of 1115 may be performed according to the methods described herein. In some examples, aspects of the operations of 1115 may be performed by a request component as described with reference to FIGS. 6 and 7.

At 1120, the non-relational database may remove the last data entry from memory of the non-relational database based on the delete request. The operations of 1120 may be performed according to the methods described herein. In some examples, aspects of the operations of 1120 may be performed by a deletion component as described with reference to FIGS. 6 and 7.

At 1125, the non-relational database may receive, at the non-relational database, a read request indicating a first data object identifier. The operations of 1125 may be performed according to the methods described herein. In some examples, aspects of the operations of 1125 may be performed by a request component as described with reference to FIGS. 6 and 7.

At 1130, the non-relational database may identify a second data object identifier according to a first data object association of the stored set of data object associations that is indexed in the non-relational database with the first data object identifier. The operations of 1130 may be performed according to the methods described herein. In some examples, aspects of the operations of 1130 may be performed by a data identifier component as described with reference to FIGS. 6 and 7.

At 1135, the non-relational database may store, in the non-relational database, a data object association indexed with the first data object identifier and indicating the second data object identifier based on the data migration or data replication procedure. The operations of 1135 may be performed according to the methods described herein. In some examples, aspects of the operations of 1135 may be performed by a data storage component as described with reference to FIGS. 6 and 7.

At 1140, the non-relational database may determine that a last data entry that is indexed in the non-relational database with the identified second data object identifier and is associated with the first data object identifier has been deleted from the non-relational database. The operations of 1140 may be performed according to the methods described herein. In some examples, aspects of the operations of 1140 may be performed by an index component as described with reference to FIGS. 6 and 7.

At 1145, the non-relational database may delete the first data object association from the non-relational database in response to the read request and based on the determining. The operations of 1145 may be performed according to the methods described herein. In some examples, aspects of the operations of 1145 may be performed by a deletion component as described with reference to FIGS. 6 and 7.

A method of handling data object associations within a non-relational database is described. The method may include storing, at the non-relational database, a set of data object associations, where each association of the set of data object associations corresponds to a data object relational index stored in a relational database, receiving, at the non-relational database, a read request indicating a first data object identifier, identifying a second data object identifier according to a first data object association of the stored set of data object associations that is indexed in the non-relational database with the first data object identifier, determining that a last data entry that is indexed in the non-relational database with the identified second data object identifier and is associated with the first data object identifier has been deleted from the non-relational database, and deleting the first data object association from the non-relational database in response to the read request and based on the determining.

An apparatus for handling data object associations within a non-relational database is described. The apparatus may include a processor, memory in electronic communication with the processor, and instructions stored in the memory. The instructions may be executable by the processor to cause the apparatus to store, at the non-relational database, a set of data object associations, where each association of the set of data object associations corresponds to a data object relational index stored in a relational database, receive, at the non-relational database, a read request indicating a first data object identifier, identify a second data object identifier according to a first data object association of the stored set of data object associations that is indexed in the non-relational database with the first data object identifier, determine that a last data entry that is indexed in the non-relational database with the identified second data object identifier and is associated with the first data object identifier has been deleted from the non-relational database, and delete the first data object association from the non-relational database in response to the read request and based on the determining.

Another apparatus for handling data object associations within a non-relational database is described. The apparatus may include means for storing, at the non-relational database, a set of data object associations, where each association of the set of data object associations corresponds to a data object relational index stored in a relational database, receiving, at the non-relational database, a read request indicating a first data object identifier, identifying a second data object identifier according to a first data object association of the stored set of data object associations that is indexed in the non-relational database with the first data object identifier, determining that a last data entry that is indexed in the non-relational database with the identified second data object identifier and is associated with the first data object identifier has been deleted from the non-relational database, and deleting the first data object association from the non-relational database in response to the read request and based on the determining.

A non-transitory computer-readable medium storing code for handling data object associations within a non-relational database is described. The code may include instructions executable by a processor to store, at the non-relational database, a set of data object associations, where each association of the set of data object associations corresponds to a data object relational index stored in a relational database, receive, at the non-relational database, a read request indicating a first data object identifier, identify a second data object identifier according to a first data object association of the stored set of data object associations that is indexed in the non-relational database with the first data object identifier, determine that a last data entry that is indexed in the non-relational database with the identified second data object identifier and is associated with the first data object identifier has been deleted from the non-relational database, and delete the first data object association from the non-relational database in response to the read request and based on the determining.

Some examples of the method, apparatuses, and non-transitory computer-readable medium described herein may further include operations, features, means, or instructions for receiving, at the non-relational database, a delete request for the last data entry that may be indexed in the non-relational database with the identified second data object identifier and removing the last data entry from memory of the non-relational database based on the delete request.

In some examples of the method, apparatuses, and non-transitory computer-readable medium described herein, the first data object association may be deleted from the non-relational database asynchronous to removing the last data entry from the memory of the non-relation database, and where a system performance metric of the non-relational database corresponding to the asynchronous deleting may be greater than a system performance metric corresponding to a synchronous delete procedure.

Some examples of the method, apparatuses, and non-transitory computer-readable medium described herein may further include operations, features, means, or instructions for storing, in the non-relational database, one or more data entries that may be indexed with the second data object identifier and may be associated with the first data object identifier based on a data migration or data replication procedure from the relational database to the non-relational database and storing, in the non-relational database, a data object association indexed with the first data object identifier and indicating the second data object identifier based on the data migration or data replication procedure.

In some examples of the method, apparatuses, and non-transitory computer-readable medium described herein, storing the data object association in the non-relational database may include operations, features, means, or instructions for searching the non-relational database for whether the set of data object associations includes the data object association indexed with the first data object identifier and indicating the second data object identifier, where storing the data object association may be based on the searching.

In some examples of the method, apparatuses, and non-transitory computer-readable medium described herein, the one or more data entries may be stored in a first primary key table of the non-relational database, where a primary key of the first primary key table includes a data object type of the second data object identifier and the data object association may be stored in a second primary key table of the non-relational database, where a primary key of the second primary key table includes a data object type of the first data object identifier.

In some examples of the method, apparatuses, and non-transitory computer-readable medium described herein, the read request includes a query for data corresponding to the first data object identifier.

Some examples of the method, apparatuses, and non-transitory computer-readable medium described herein may further include operations, features, means, or instructions for transmitting, in response to the read request and based on the determining, an indication that the queried data does not exist in the non-relational database.

In some examples of the method, apparatuses, and non-transitory computer-readable medium described herein, the set of data object associations includes associations between user activities and data objects.

In some examples of the method, apparatuses, and non-transitory computer-readable medium described herein, the user activities include sending or receiving emails, accepting calendar events, sending or receiving short message service (SMS) text messages, sending or receiving voice calls, posting or interacting with social media messages, or a combination thereof and the data objects include customer relationship management (CRM) data objects including contacts, accounts, organizations, cases, opportunities, or a combination thereof.

In some examples of the method, apparatuses, and non-transitory computer-readable medium described herein, the non-relational database includes a set of distributed machines for data storage.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for handling data object associations within a non-relational database, comprising:
   storing, at the non-relational database, a plurality of data object associations, wherein each association of the plurality of data object associations corresponds to a data object relational index stored in a relational database;
   receiving, at the non-relational database, a read request indicating a first data object identifier;
   identifying a second data object identifier according to a first data object association of the stored plurality of data object associations that is indexed in the non-relational database with the first data object identifier;
   determining that a last data entry that is indexed in the non-relational database with the identified second data object identifier and is associated with the first data object identifier has been deleted from the non-relational database; and
   deleting the first data object association from the non-relational database in response to the read request and based at least in part on the determining.

2. The method of claim 1, further comprising:
   receiving, at the non-relational database, a delete request for the last data entry that is indexed in the non-relational database with the identified second data object identifier; and
   removing the last data entry from memory of the non-relational database based at least in part on the delete request.

3. The method of claim 2, wherein the first data object association is deleted from the non-relational database asynchronous to removing the last data entry from the memory of the non-relation database, and wherein a system performance metric of the non-relational database corresponding to the asynchronous deleting is greater than a system performance metric corresponding to a synchronous delete procedure.

4. The method of claim 1, further comprising:
   storing, in the non-relational database, one or more data entries that are indexed with the second data object identifier and are associated with the first data object identifier based at least in part on a data migration or data replication procedure from the relational database to the non-relational database; and
   storing, in the non-relational database, a data object association indexed with the first data object identifier and indicating the second data object identifier based at least in part on the data migration or data replication procedure.

5. The method of claim 4, wherein storing the data object association in the non-relational database comprises:
   searching the non-relational database for whether the plurality of data object associations comprises the data object association indexed with the first data object identifier and indicating the second data object identifier, wherein storing the data object association is based at least in part on the searching.

6. The method of claim 4, wherein storing the data object association in the non-relational database is based at least in part on a maximum number of indices supported for data entries in the non-relational database.

7. The method of claim 4, wherein:
the one or more data entries are stored in a first primary key table of the non-relational database, wherein a primary key of the first primary key table comprises a data object type of the second data object identifier; and
the data object association is stored in a second primary key table of the non-relational database, wherein a primary key of the second primary key table comprises a data object type of the first data object identifier.

8. The method of claim 1, wherein the read request comprises a query for data corresponding to the first data object identifier.

9. The method of claim 8, further comprising:
transmitting, in response to the read request and based at least in part on the determining, an indication that the queried data does not exist in the non-relational database.

10. The method of claim 1, wherein the plurality of data object associations comprises associations between user activities and data objects.

11. The method of claim 10, wherein:
the user activities comprise sending or receiving emails, accepting calendar events, sending or receiving short message service (SMS) text messages, sending or receiving voice calls, posting or interacting with social media messages, or a combination thereof; and
the data objects comprise customer relationship management (CRM) data objects comprising contacts, accounts, organizations, cases, opportunities, or a combination thereof.

12. The method of claim 1, wherein the non-relational database comprises a plurality of distributed machines for data storage.

13. An apparatus for handling data object associations within a non-relational database, comprising:
a processor,
memory in electronic communication with the processor; and
instructions stored in the memory and executable by the processor to cause the apparatus to:
store, at the non-relational database, a plurality of data object associations, wherein each association of the plurality of data object associations corresponds to a data object relational index stored in a relational database;
receive, at the non-relational database, a read request indicating a first data object identifier;
identify a second data object identifier according to a first data object association of the stored plurality of data object associations that is indexed in the non-relational database with the first data object identifier;
determine that a last data entry that is indexed in the non-relational database with the identified second data object identifier and is associated with the first data object identifier has been deleted from the non-relational database; and
delete the first data object association from the non-relational database in response to the read request and based at least in part on the determining.

14. The apparatus of claim 13, wherein the instructions are further executable by the processor to cause the apparatus to:
receive, at the non-relational database, a delete request for the last data entry that is indexed in the non-relational database with the identified second data object identifier; and
remove the last data from memory of the non-relational database based at least in part on the delete request.

15. The apparatus of claim 13, wherein the instructions are further executable by the processor to cause the apparatus to:
store, in the non-relational database, one or more data entries that are indexed with the second data object identifier and are associated with the first data object identifier based at least in part on a data migration or data replication procedure from the relational database to the non-relational database; and
store, in the non-relational database, a data object association indexed with the first data object identifier and indicating the second data object identifier based at least in part on the data migration or data replication procedure.

16. The apparatus of claim 15, wherein the instructions to store the data object association in the non-relational database are executable by the processor to cause the apparatus to:
search the non-relational database for whether the plurality of data object associations comprises the data object association indexed with the first data object identifier and indicating the second data object identifier, wherein storing the data object association is based at least in part on the searching.

17. A non-transitory computer-readable medium storing code for handling data object associations within a non-relational database, the code comprising instructions executable by a processor to:
store, at the non-relational database, a plurality of data object associations, wherein each association of the plurality of data object associations corresponds to a data object relational index stored in a relational database;
receive, at the non-relational database, a read request indicating a first data object identifier;
identify a second data object identifier according to a first data object association of the stored plurality of data object associations that is indexed in the non-relational database with the first data object identifier;
determine that a last data entry that is indexed in the non-relational database with the identified second data object identifier and is associated with the first data object identifier has been deleted from the non-relational database; and
delete the first data object association from the non-relational database in response to the read request and based at least in part on the determining.

18. The non-transitory computer-readable medium of claim 17, wherein the instructions are further executable to:
receive, at the non-relational database, a delete request for the last data entry that is indexed in the non-relational database with the identified second data object identifier; and
remove the last data entry from memory of the non-relational database based at least in part on the delete request.

19. The non-transitory computer-readable medium of claim 17, wherein the instructions are further executable to:
store, in the non-relational database, one or more data entries that are indexed with the second data object identifier and are associated with the first data object identifier based at least in part on a data migration or data replication procedure from the relational database to the non-relational database; and store, in the non-relational database, a data object association indexed with the first data object identifier and indicating the second data object identifier based at least in part on the data migration or data replication procedure.

20. The non-transitory computer-readable medium of claim 19, wherein the instructions to store the data object association in the non-relational database are executable to:
search the non-relational database for whether the plurality of data object associations comprises the data object association indexed with the first data object identifier and indicating the second data object identifier, wherein storing the data object association is based at least in part on the searching.

* * * * *